UNITED STATES PATENT OFFICE.

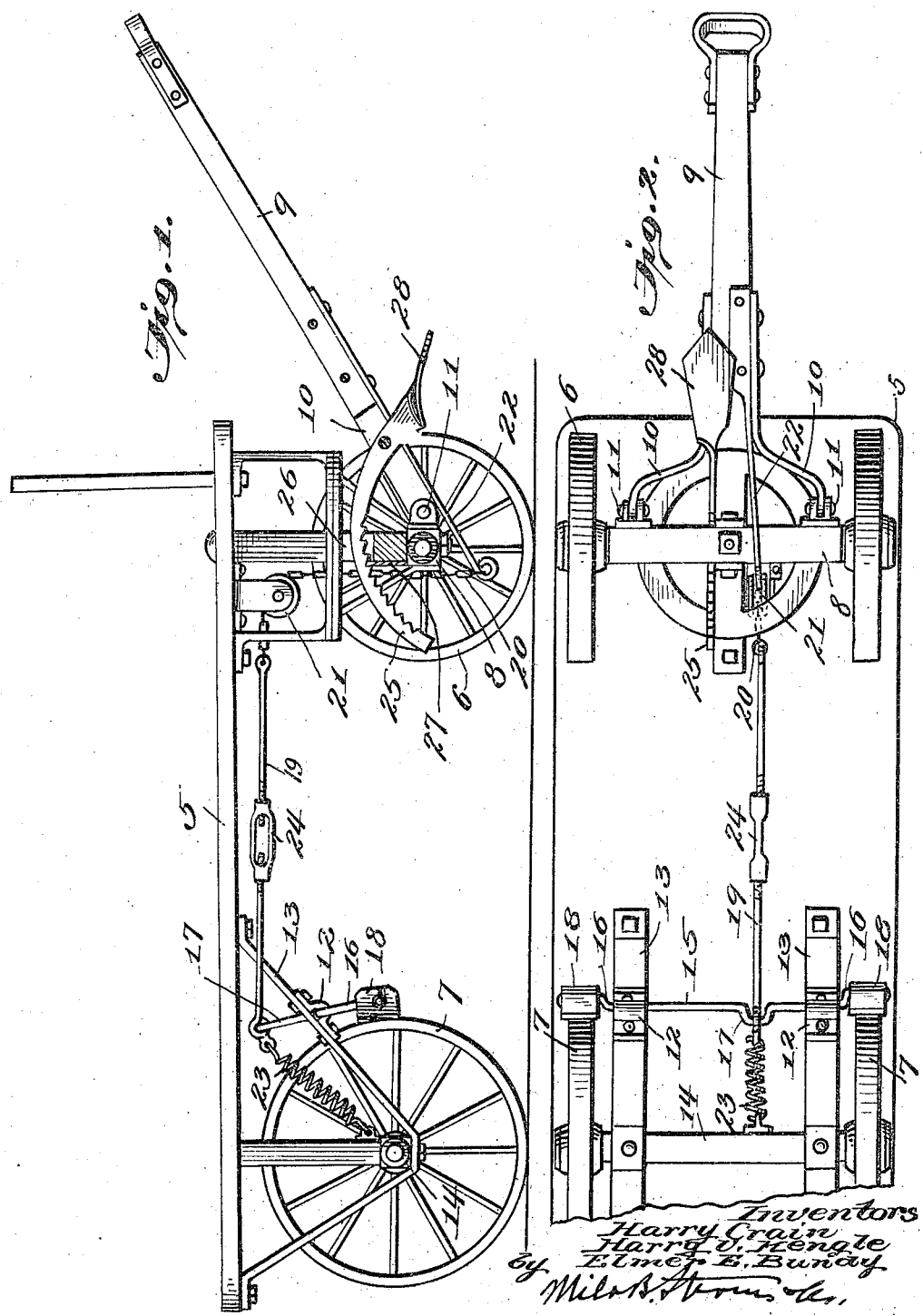

HARRY CRAIN, HARRY V. KENGLE, AND ELMER E. BUNDY, OF ENID, OKLAHOMA.

TRUCK.

1,240,178.  Specification of Letters Patent.  Patented Sept. 18, 1917.

Application filed December 21, 1916. Serial No. 138,235.

*To all whom it may concern:*

Be it known that we, HARRY CRAIN, HARRY V. KENGLE, and ELMER E. BUNDY, citizens of the United States, residing at Enid, in the county of Garfield and State of Oklahoma, have invented new and useful Improvements in Trucks, of which the following is a specification.

This invention relates to trucks employed for hauling baggage, and the object is to provide the truck with a novel and improved brake mechanism, the brake being controlled by the tongue by means of which the truck is hauled about.

The object stated is attained by means of a combination and arrangement of parts to be hereinafter described and claimed, and in order that the same may be better understood, reference is had to the accompanying drawing forming a part of this specification.

In the drawing,

Figure 1 is a side elevation of the truck, partly in section, showing the application of the invention; and Fig. 2 is an inverted plan view partly broken away.

Referring specifically to the drawing, 5 denotes the platform of the truck on which the baggage to be transported is supported. The platform is supported by front and hind wheels 6 and 7, respectively. The axle 8 of the front wheels is swiveled to facilitate steering of the truck, and the truck is hauled around by means of a tongue 9 carried by a fork 10, the branches of which are pivoted, as shown at 11, to the axle 8 so that the tongue may be swung up and down. This swinging movement of the draft tongue is utilized for operating a brake for the hind wheels 7, said brake mechanism comprising the following parts:

In suitable bearings 12 carried by bracket members or braces 13 extending between the axle 14 of the hind wheels 7 and the bottom of the platform 5, is journaled a rock shaft 15 having crank arms 16 at its ends and a crank 17 intermediate its ends. The crank arms 16 carry brake shoes 18 positioned to engage the peripheries of the wheels 7. To the crank 17 is connected the rear end of a draw bar 19 which extends forwardly in the direction of the length of the truck, and has connected to its forward end a pull chain, cable, or other suitable flexible member 20 which passes over a pulley 21 mounted on the bottom of the platform and thence extends downwardly and is made fast to an arm 22 fixed to the butt end of the draft tongue 9 and extending rearwardly therefrom. The arm 22 forms an extension of the draft tongue 9 and terminates some distance back of the pivot 11 of said tongue. It will therefore be seen that when the draft tongue 9 is swung upwardly, the chain 20 is pulled downward, whereby the draw bar 19 is pulled forwardly and through the crank 17 the shaft 15 is rocked to engage the shoes 18 with the wheels 7. This movement of the draw bar 19 is against the tension of a spring 23 connected to its rear end, and hence, when the draft tongue 9 is lowered, the spring draws the bar 19 rearward to release the brake shoes from the wheels.

The draw bar 19 is made in two sections connected by a turnbuckle 24 so that it may be lengthened or shortened to properly adjust the brake mechanism.

In order to lock the brake in set position, the draft tongue 9, or one of the fork branches 10 carries a pivoted, arcuate ratchet bar 25 which extends rearward and passes loosely through an aperture 26 in the front bolster of the truck. The teeth of the ratchet or latch bar 25 are on its bottom edge so that they may engage the edge of a plate 27 carried by the bolster and located adjacent to the aperture 26. The ratchet teeth are inclined in such a direction that they slip over the plate 27 when the tongue is swung to set the brake, but they take hold to prevent a swing of the tongue in the opposite direction. Thus it will be seen that before the brake can be released, the ratchet must be disengaged from the plate 27, which is readily done by pressing on a foot plate 28 on the forward end of the ratchet. The tongue is now free to be swung downward to allow the spring 23 to effect the release of the brake in the manner hereinbefore described.

We claim:—

1. The combination of a truck having a pivoted draft tongue, a brake for the truck wheels, brake-operating means, an arm extending from the butt end of the draft tongue and terminating below and to the rear of the pivot of the tongue, a flexible connection between the outer end of said arm and the aforesaid brake-operating means, and a guide on the truck for said flexible connection.

2. The combination of a truck having a swinging draft tongue, a brake for the truck wheels operatively connected to the draft tongue and set when said tongue is swung in one direction, means for releasing the brake when the tongue is swung in the opposite direction, a pivoted ratchet bar carried by the draft tongue, and a keeper on the truck normally engageable by the ratchet bar, the teeth of said ratchet bar being arranged for holding the tongue against a swing in the last-mentioned direction.

3. The combination of a truck having a swinging draft tongue, a brake for the truck wheels operatively connected to the draft tongue and set when said tongue is swung in one direction, means for releasing the brake when the tongue is swung in the opposite direction, a pivoted ratchet bar carried by the draft tongue, and a keeper plate on the front bolster of the truck engageable by the ratchet bar for holding the tongue against a swing in the last-mentioned direction, said truck bolster having an aperture through which the ratchet bar slidably passes.

In testimony whereof we affix our signatures.

HARRY CRAIN.
HARRY V. KENGLE.
ELMER E. BUNDY.

Copies of this patent may be obtained for five cents each, by addressing the "Commissioner of Patents, Washington, D. C."